United States Patent [19]

Johnson

[11] 4,328,636
[45] May 11, 1982

[54] DEVICE FOR INSECT CONTROL AND METHOD

[76] Inventor: Richard D. Johnson, 29 W. Ash St., Lombard, Ill. 60148

[21] Appl. No.: 164,260

[22] Filed: Jun. 30, 1980

[51] Int. Cl.³ ............................................... A01M 1/10
[52] U.S. Cl. ........................................ 43/107; 43/118; 43/122; 119/51 R
[58] Field of Search ................. 43/107, 118, 121, 122, 43/133, 132; 119/1, 3, 51 R

[56] References Cited

U.S. PATENT DOCUMENTS

| | | | |
|---|---|---|---|
| 1,936,644 | 11/1933 | Schroder | 43/118 X |
| 2,086,046 | 7/1937 | Preston | 43/107 X |
| 3,997,999 | 12/1976 | Evans | 43/107 |
| 4,002,146 | 1/1977 | Neff | 119/51 R |
| 4,019,459 | 4/1977 | Neff | 119/51 R |

Primary Examiner—Frank T. Yost
Attorney, Agent, or Firm—Hill, Van Santen, Steadman, Chiara & Simpson

[57] ABSTRACT

An insect controlling device and method which provides an environment within foraminous barrier to which at least certain fertilized female insects will be attracted to deposit their eggs, and in the barrier assuring wasting of the thus deposited insect eggs. The barrier may take a number of different forms for selectively controlling various species of insects, such as fruit flies, house flies, mosquitos and the like. The barrier may serve the dual function of insect control and predatory creature food supply, such as a bird feeder, fish feeder, or the like. For mosquito control the barrier prevents hatched mosquito larva or mosquitos from escaping a body of water in which the mosquitos may incubate.

15 Claims, 8 Drawing Figures

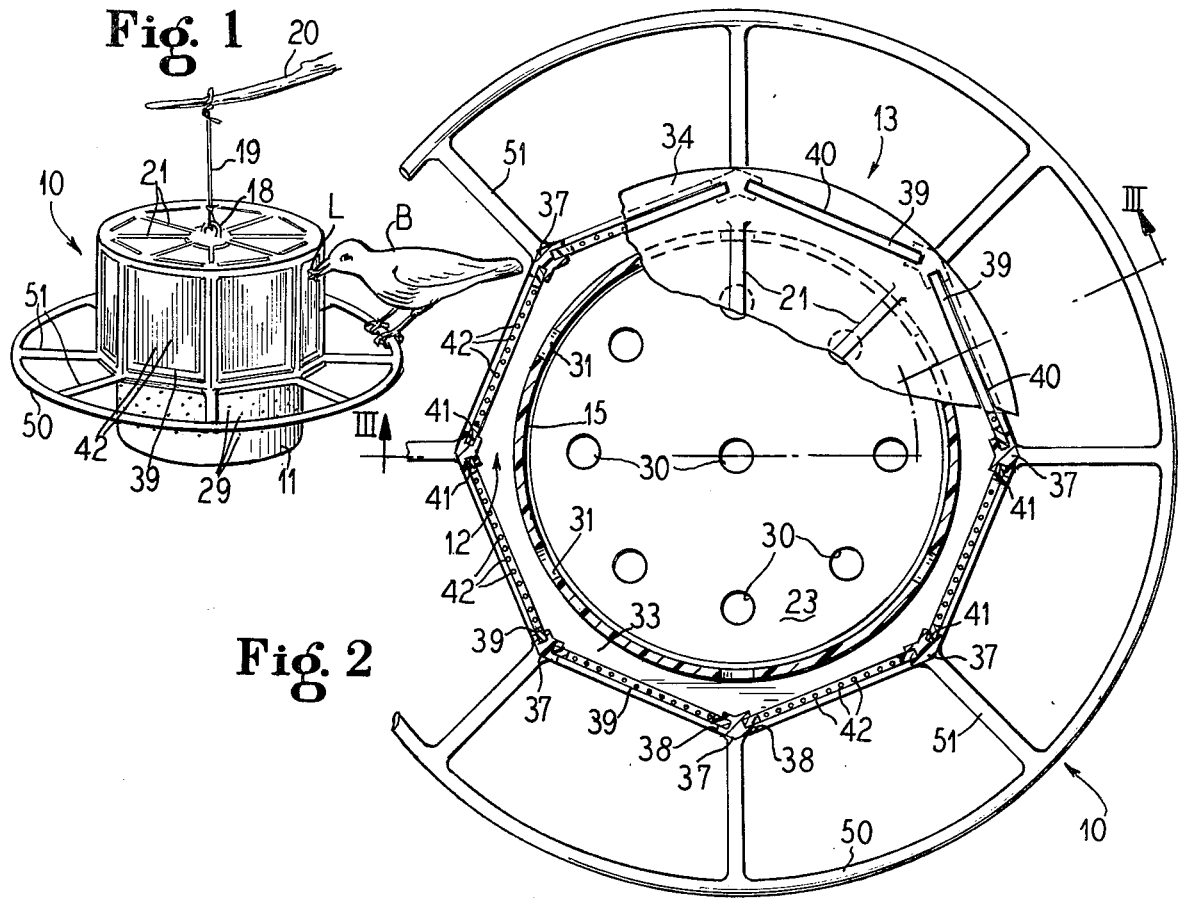
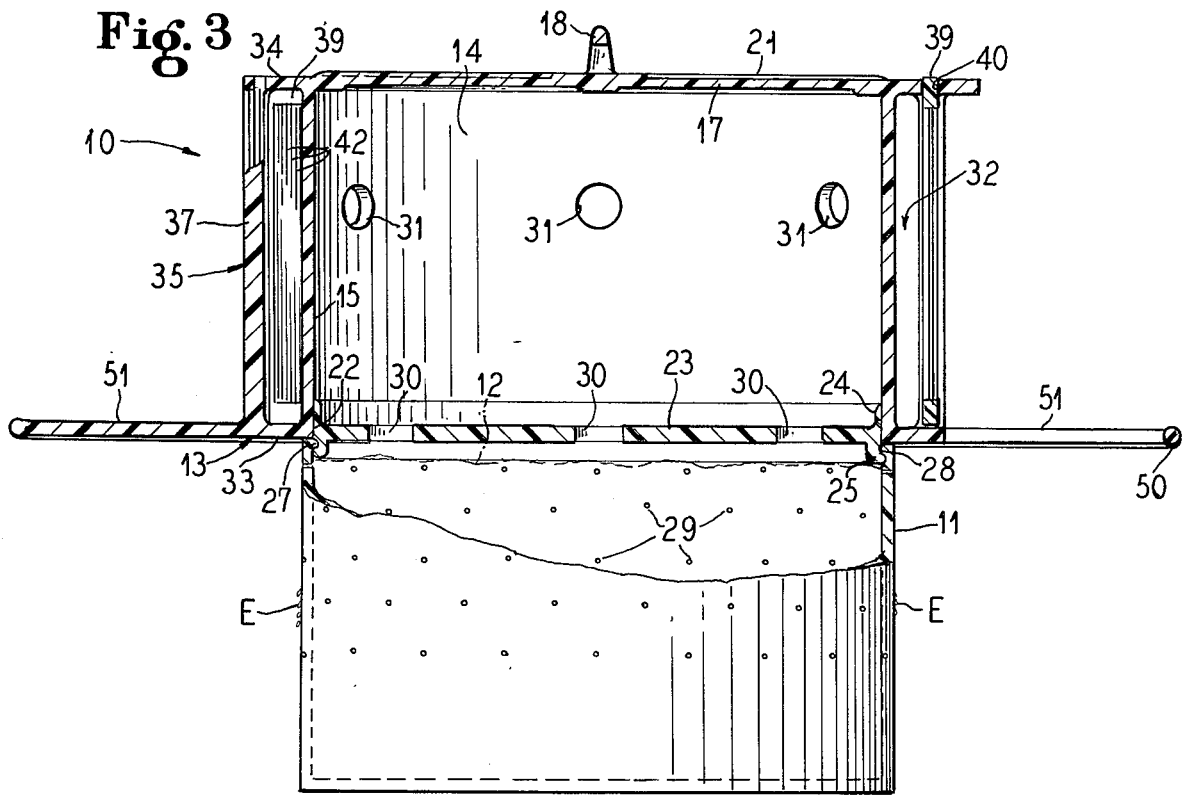

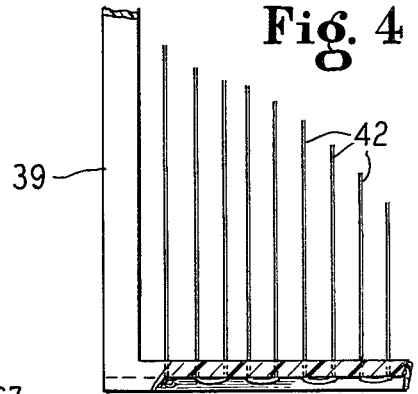
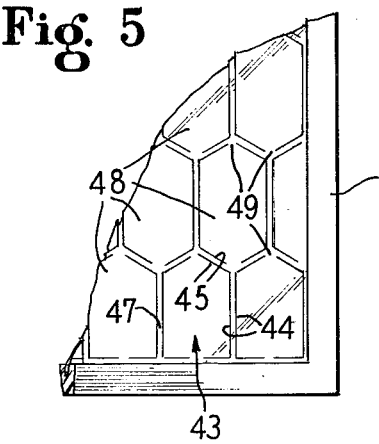
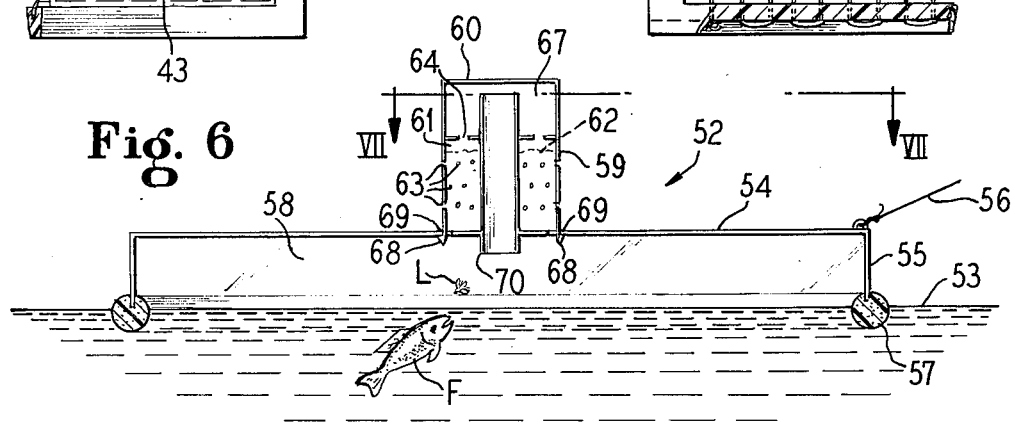
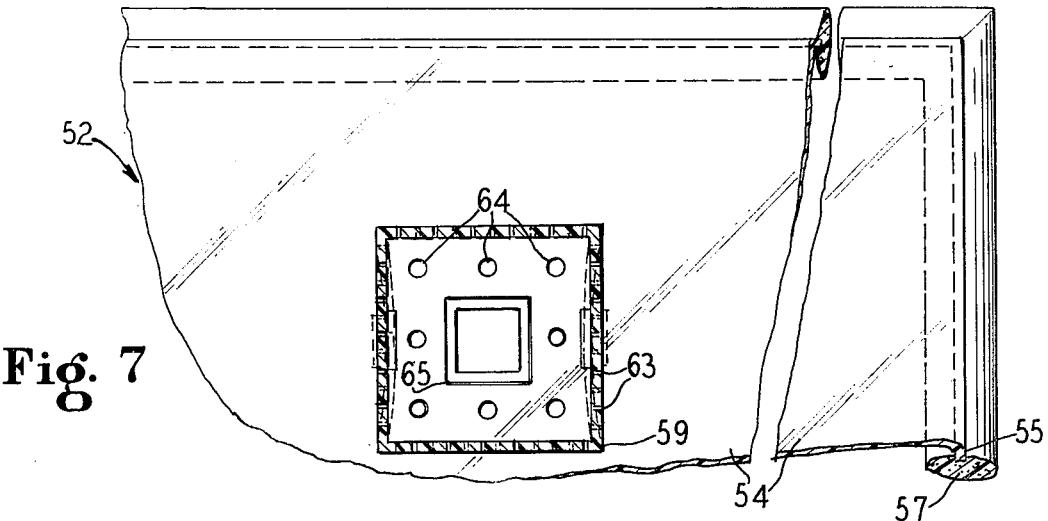
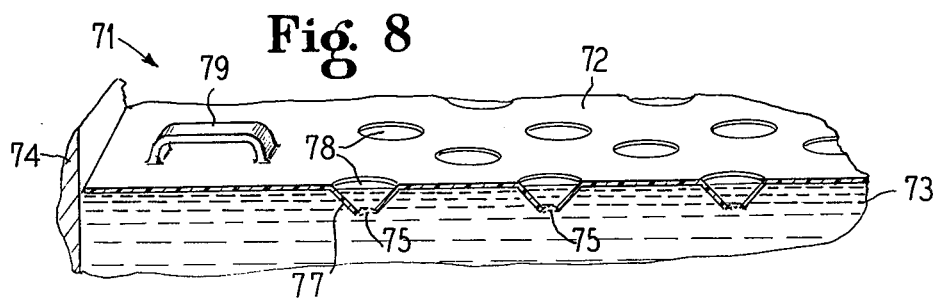

DEVICE FOR INSECT CONTROL AND METHOD

This invention relates to the art of insect control, and is more particularly concerned with a new and improved insect control device and method.

Numerous and varied expedients for insect control have been proposed with more or less success, such as male insect sterilization requiring elaborate laboratory procedures, chemical poisoning which is generally not selective so that both noxious and beneficial insects are indiscriminately destroyed, trapping which is generally not selective, and the like. Further, at least some prior insect control or exterminating expedients have discouraged or even substantially eliminated noninsect predators, such as birds and fish, and more particularly those predators which feed on certain species of insects. Inasmuch as it is virtually impossible to irradicate any species of insects completely, the predator population should be maintained for assurance of continued insect control.

It is therefore an object of the invention to provide a new and improved device and method for insect control which is environmentally safe, efficient, which may be selective as to the insects to be controlled and which is adapted for inviting predators to assist in the insect control.

Another object of the invention is to provide a device and method for insect control operating on the principle of causing the insects to waste their fertility.

The invention provides a device for insect control, which comprises means for providing an environment to which at least certain fertilized female insects will be attracted to deposit their eggs, and said means assuring wasting of the thus deposited eggs.

More particularly the invention provides an insect controlling device comprising an insect barrier adapted to intervene between an insect infested environment and an insect incubatory medium attractive to at least a certain species of fertilized female insects from the insect infested environment, and the barrier having hole means therethrough small enough to preclude any adult insect or developed larva from escaping from inside the barrier through said hole means, such hole means being only large enough to receive therethrough from outside the barrier insect eggs from said medium, or to permit entry of tiny newly hatched larva attracted to the medium, and the small size of the hole means assuring that developed larva and insects maturing from the larva will be trapped inside said barrier against leaving said barrier to enter said environment.

The invention also provides a method of controlling insects which comprises providing an environment to which at least certain fertilized female insects will be attracted to deposit their eggs, and assuring wasting of the thus deposited eggs.

More particularly, the invention provides a method of controlling insects comprising intervening an insect barrier between an insect infested environment and an insect incubatory medium attractive to at least a certain species of fertilized female insects from said insect infested environment, receiving from outside said barrier eggs from said female insects or tiny newly hatched larva through hole means in said insect barrier small enough to preclude an adult insect or developed larva from escaping from inside said barrier through the hole means, and trapping within the barrier and against entering said environment any developed larva or insects maturing from the larva.

Other objects, features and advantages of the invention will be readily apparent from the following description of certain representative embodiments thereof, taken in conjunction with the accompanying drawings although variations and modifications may be effected without departing from the spirit and scope of the novel concepts embodied in the disclosure and in which:

FIG. 1 is a perspective view of an insect controlling device embodying the invention and serving also as a bird feeder;

FIG. 2 is an enlarged top plan view partially broken away and in section of the device in FIG. 1;

FIG. 3 is a sectional detail view taken substantially along the line III—III of FIG. 2;

FIG. 4 is an enlarged fragmentary detail view of one of the screen panels employed in the device of FIG. 1;

FIG. 5 is a fragmentary detail elevational view of a modified form of the screen;

FIG. 6 is a schematic vertical sectional detail view of a device embodying the invention and adapted to float upon a body of water and having a fish feeding capability;

FIG. 7 is an enlarged fragmental sectional plan view taken substantially along the line VII—VII of FIG. 6; and FIG. 8 is a fragmentary sectional perspective view showing a further modification especially suitable for mosquito control.

In one best mode embodiment of the invention (FIGS. 1-3) a device for insect control comprises means including a generally cup-shaped container 11 for providing an environment to which at least certain fertilized female insects will be attracted to deposit their eggs. In a preferred form, the container 11 is formed from thin self-sustaining plastic material which may be molded or drawn to shape and of suitable size to provide an upstanding wall of adequate diameter for the intended purpose. Within the container 11 is adapted to be received a suitable attractant or bait 12 for the insects which it is desired to control.

Support of the container 11 is adapted to be in suspended relation from a chambered housing 13 within which is provided a chamber 14 defined by an upright wall 15 and a top closure wall 17 desirably having a central upstanding hanger 18 adapted to receive a suspension cord 19 by which the device is adapted to be hung from a support such as a tree branch 20 or the like adapted to support the bird feeder in suitable position for the intended purpose. To permit the roof wall 17 to be made as thin as practicable, it may be provided with reinforcing ribs 21 radiating from the center toward the outer perimeter of the roof. Any suitable material may be employed for the housing 13 such as opaque plastic adapted to be cast or molded into desired form.

At its lower end, the wall 15 of the generally inverted cup-shaped housing 13 defines an opening 22 for registration with the top opening from the container 11. About the opening 22 means are provided for separably connecting the container 11 to the housing 13 so that from time to time the container may be cleaned out and refilled with the bait 12. For this purpose, a horizontal floor partition of a diameter to fit within the opening 22 has an upstanding annular attachment flange 24, and a depending annular connector bead flange 25 provided with a radially outwardly opening annular groove 27 receptive of a snap-in complementary annular connector bead 28 adapted to engage in releasable interlock relation with the connector bead 25 in the groove 27. The structural relationship of the beads 25 and 28 is such that inherent resilience in at least the upper lip portion of the container 11 will permit enough resilient yieldability to permit snap-in or snap-out of the bead 28, with adequate retention in the interconnected relationship of the beads.

While the cage provided by the container 11 and the housing 13 provides a barrier against alighting of insects on the bait 12, means are provided for enabling eggs from fertilized insects to be deposited on or adjacent to the bait 12. For this purpose, the upstanding wall of the container 11 is desirably foraminous and has an array of holes 29 therethrough which are small enough to prevent passage of insects or developed larva therethrough, but which may be large enough to receive therethrough the ovipositors of insects from the insect infested environment outside of the barrier so that the insects can deposit fertilized eggs in the incubatory environment within the container 11. Some insects may deposit eggs on the outside of the container near the holes 29 as shown at E. Upon hatching of the eggs, tiny larva can enter the container through the holes 29, but developed larva or mature insects cannot escape from the cage of the container through the holes 29.

Insects maturing from larvae in the container 11 are adapted to migrate from the incubatory chamber within the container 11 by way of openings 30 in the floor partition 23 and enter the housing chamber 14. Of course, in the absence of the partition 23, the larva or mature insects may travel from the chamber in the container 11 directly into the chamber 14. Exit from the chamber 14 is controlled by way of a limited number of ports 31 which open through the wall 15 preferably at a sufficient height in the wall 15 to attract the insect away from the hatching area toward the only daylight permitted into the chamber 14 by way of the ports 31. On leaving the ports 31, the insects are trapped within an annular chamber 32 about the wall 15 and from which they cannot escape to the outside environment, but from which they may be captured and consumed by birds.

In a preferred arrangement, the chamber 32 is defined about the wall 15 by means of a radially outwardly projecting generally annular ledge flange 33 extending from the lower end of the housing wall 15 and an upper annular eaves flange 34 projecting radially as an extension from the roof wall 17. Enclosing the chamber 13 in spaced relation about the housing wall 15 is a barrier wall 35 comprising a plurality of circumferentially spaced vertical pillars 37 having therebetween window openings 38 which are normally closed by means of screen panels 39. Each of the screen panels 39 comprises a preferably rectangular frame which is slidably received through a respective slot 40 in the eaves flange 34 and vertical grooves 41 aligned with the slots 40 in the pillars 37. Through this arrangement, the window screen frames 39 are adapted to be replaceably received in closing relation to the window openings 38. Each of the screen frames 39 carries screen means, such as nylon monofilament 42 which may be laced in position as shown in FIG. 4, with the filament strands close enough together to prevent escape of insect larva or adults from within the chamber 32, but permitting access for the bills of predatory birds to capture and consume the larva or insects. The access area within each of the screened frames 39 is large enough to provide reasonably clear sight into the covered area of the trap chamber 32. Further, the dimension between the bars of the frame 39 to which the screen filaments 42 are attached is sufficient to provide long enough span for the filaments to permit resilient yielding and pushing aside by the bird bills reaching for a larva or insect, but automatic return to screening position when released.

Instead of the monofilament screen arrangement 42 as in FIGS. 1-4, the screen may comprise, as shown in FIG. 5, a transparent body panel 43 affixed within the frame 39 and provided with a pattern of narrowly spaced parallel vertical slits 44 and cooperating narrowly spaced diagonal slits 45 defining a generally checkerboard narrow connected screen grid 46 integrally supporting swingably displaceable closure panel segments 48 which are connected to the grid 47 at limited solid connections 49 which provide at respective opposite ends of each of the panel sections aligned resilient connecting pivots about which the panel segments are adapted to swing. By constructing the screen 43 from tough resiliently flexible self-sustaining thin plastic material, the screen panel segments 48 will normally maintain a position in the plane of the body panel 43 but can easily be swingably displaced by a bird's beak inserted into the trap chamber for capturing a larva or insect which has migrated into such chamber. Instantly upon withdrawal of the bird's beak, the affected panel will snap back into its planar relation in the body panel to close the access opening associated with the affected panel.

To encourage bird activity in respect to the feeder 10, a perch is desirably provided on the housing 35, conveniently comprising an annular perch ring 50 of suitable diameter greater than the diameter of the housing and connected as by means of integral radial connecting rods 51 to the base flange 33. Thereby a bird B (FIG. 1) may rest upon the perch 50 at any of the windows of the device for capturing an insect or larva L from within the trap chamber 32.

On reference to FIGS. 6 and 7, an insect control device 52 embodying the invention is depicted which is especially suitable to serve as a fish feeder on a body of water 53 such as a pool, pond or stream containing fish F which will feed on grubs, larva or insects L. To this end, the device 52 comprises a floating hollow platform 54 formed from a translucent material, such as form-retaining plastic material. Entirely about the platform 54 is a continuous depending skirt 55 having its lower end attached to a preferably continuous float 57 by which the platform is floatingly supported on the blody of water 53 and with the platform 54 raised sufficiently above the water to define a trap chamber 58. A tether 56 may be attached to the platform 54.

Supported on the platform 54 are means for providing an environment to which at least certain fertilized female insects will be attracted to deposit their eggs. This desirably comprises an inverted opaque bucket-shaped housing and container 59 which has a closed top 60 and is open at the bottom. Within the housing 59 is a bait chamber 61 adapted to be partially or substantially filled with bait 62 which will attract at least a certain species of insects. Eggs from fertilized female insects may be received into the bait chamber 61 into or onto the bait 62 through an array of holes 63 which are small enough to preclude an adult insect or developed larva from passing through the holes but large enough so that the female insects can introduce their ovipositors through the holes to the bait, or to permit tiny larva from eggs deposited on the outside of the container 59 to enter the bait chamber. Adult insects are adapted to leave the bait and incubation chamber 61 through openings 64 in a horizontal opaque partition spaced from the top 60 and positioning a tubular vertical opaque passage member 65 concentrically within the housing 59. At its upper end, the tubular member 65 opens in spaced relation to the top 60 into a receiving chamber 67 to which the insects are attracted from the chamber 61 by light received from the chamber 58 through the passage in the chamber 65 which opens downwardly into the chamber 58. By having the housing 59 and the tube 65 formed from opaque material insects will be induced to leave the receiving chamber 67 and follow the light down through the passage in the tube 65 into the chamber 58 where the insects will be trapped and thus attract the fish F to capture the insects.

For removably connecting the housing 59 to the platform 54, suitable means may be provided such as depending slightly outwardly curved interlock tabs 68 on the lower edges of opposite sides of the housing 59 and received in complementary slots 69 in the platform 54. Entry of the tabs 68 into the slots 69 is adapted to be effected by pressing in on the tab carrying sides until the tips of the tabs 68 clear into the slots 69 whereupon the edge of the housing 59 is dropped onto the platform 54, and the tabs 68 came down into the slots 69 and by the resilient spreading of the tabbed side walls retain the housing 59 in place until a reverse action causes the housing to be separated from the platform 54. Desirably, the lower end of the tube 65 may serve as a centering guide by extending downwardly at its lower end portion through a clearance hole 70 in the platform 54. To serve as a lead-in for guiding the housing into place, the lower end portion of the tube 65 may extend downwardly to a greater length than the lower ends of the tabs 68.

Another form of insect control device 71 embodying the invention, as depicted in FIG. 8, is especially suitable for controlling mosquitos against propagation. In this instance, the device comprises a panel 72 which is adapted to float on a confined body of water 73 retained in a suitable reservoir container 74 which may be a bucket, open top tank or the like. About its perimeter, the floating insect control panel 72 is dimensioned to fit fairly closely but freely within the wall of the container 74. At numerous spaced intervals, the panel 72 has insect egg receiving holes 75 which are desired at the lower ends of generally conically shaped integral funnel-like depressions 77 projecting downwardly on the panel 72 and providing small individual relatively shallow pools 78 of water to which the mosquitos will be attracted and in which the mosquitos will deposit their eggs to drop down through the holes 75 into the body of water 73. The holes 75 are too small for mosquito larva or adult mosquitos to escape, and therefore they will drown since they cannot leave the body of water 73 in view of the barrier provided by the panel 72.

A handle 79 may be provided on top of the panel 72 to facilitate handling the panel.

From the foregoing, it will be apparent that the invention provides novel insect control by tricking fertilized female insects to waste their eggs, as by depositing their eggs to the inside or outside of a barrier contiguous to an insect attractant, and desirably incubatory medium. Upon hatching of the eggs, the mature larva and any insects maturing from the larva will be trapped either to perish in or at least behind the device or may serve as food for predators attracted to the device by the presence of the larva or insects. Particular species of insects can be attracted by providing appropriate bait. For example, where fruit fly control is desired, a control device appropriate for such flies and baited with fruit attractive to those insects will trick them into depositing their eggs within or on the barrier. For house fly control, any form of fly-attractant garbage may be used as the bait. Aside from mosquitos which require water for propagation, most insects will be attracted to a suitable bait by odor emitted by the bait.

By virtue of the capability of at least certain of the insect control devices of the present invention to serve as feeders, insect predators can be encouraged to thrive by feeding on the trapped insects and thus further enhance control of the insects by remaining in the area and in addition feeding on insects that may have escaped being attracted to the control device or even after having been attracted to the control device.

In all forms of the device, the insects are tricked into wasting their eggs because, after hatching, the larva or resultant adults are trapped against entering the environment which was infested by the parent insects.

It will be understood that variations and modifications may be effected without departing from the spirit and scope of the novel concepts of this invention.

I claim as my invention:

1. An insect controlling device comprising:
    an insect barrier adapted to intervene between an insect infested environment and an insect incubatory medium attractive to at least a certain species of fertilized female insects from said infested environment;
    said barrier having hole means therethrough small enough to preclude any adult insects or developed larva from escaping from inside said hole means;
    said hole means being only large enough to receive therethrough from outside of said barrier insect eggs, or tiny newly hatched larva attracted to said medium, and the small size of the hole means assuring that developed larva and insects maturing from the larva from will be trapped inside said barrier against leaving said barrier to enter said environment;
    said device comprising a bird feeder wherein said barrier comprises a perforate insect incubatory medium bait cage, and a trap chamber accessible by migration from within said cage to larva or insects maturing from the larva, and means affording access into said trap chamber of bird bills for capturing insects in said trap chamber but precluding insect or larva escape from the trap chamber.

2. A device according to claim 1, wherein said access means comprise flexible screen means.

3. A device according to claim 2, wherein said screen means comprise parallel flexible strands.

4. A device according to claim 2, wherein said screen means comprise a panel subdivided into resiliently pivotally connected panel segments.

5. A device according to claim 1, wherein said housing has means for suspending it in a location frequented by birds, bird perch means on the housing conveniently located relative to said trap chamber by the bills of predatory birds for capturing insects.

6. An insect controlling device comprising:
    an insect barrier adapted to intervene between an insect infested environment and an insect incubatory medium attractive to at least a certain species of fertilized female insects from said infested environment;

and said barrier having hole means therethrough small enough to preclude any adult insects or developed larva from escaping from inside said barrier through said hole means;

said hole means being only large enough to receive therethrough from outside of said barrier insect eggs, or tiny newly hatched larva attracted to said medium, and the small size of the hole means assuring that developed larva and insects maturing from the larva will be trapped inside said barrier against leaving said barrier to enter said environment;

said device being in the form of a fish feeder, comprising a platform providing a downwardly opening chamber and float means for supporting the platform on a body of fish-containing water, and said insect barrier being mounted on said platform and having passage means for migration of larva or insects maturing from larva into a chamber under said platform to serve as fish food.

7. A device according to claim 6, wherein said barrier comprises a chambered member and means for releasably mounting the chambered member on said platform.

8. An insect controlling device comprising:

an insect barrier adapted to intervene between an insect infested environment and an insect incubatory medium attractive to at least a certain species of fertilized female insects from said infested environment;

said barrier having hole means therethrough small enough to preclude any adult insects or developed larva from escaping from inside said barrier through said hole means;

said hole means being only large enough to receive therethrough from outside of said barrier insect eggs, or tiny newly hatched larva attracted to said medium, and the small size of the hole means assuring that developed larva and insects maturing from the larva will be trapped inside said barrier against leaving said barrier to enter said environment;

said barrier comprising a panel adapted to float on a body of water comprising the insecting incubatory medium and attractive to mosquitos, said panel having water pool depressing funneling toward holes in the bottoms of the depressions.

9. A device according to claim 8, in combination with a container for holding a body of water on which said panel is adapted to float, the perimeter of the panel being dimensioned for free floating fit in cooperation with the wall of the container.

10. A method of controlling insects, comprising:

intervening an insect barrier between an insect infested environment and an insect incubatory medium attractive to at least a certain species of fertilized female insects from said insect infested environment; receiving from outside said barrier eggs from said female insects or tiny newly hatched larva through hole means in said insect barrier small enough to preclude an adult insect or developed larva from escaping from inside said barrier through the hole means; trapping within said barrier and against entering said environment any developed larva or insects maturing from the larva;

providing said barrier in the form of a bird feeder having a perforate insect incubatory medium bait cage, providing a trap chamber accessible by migration from within said cage to larva or insects maturing from the larva, and affording access into said trap chamber of bird bills for capturing insects in said trap chamber but precluding insect or larva escape from said trap chamber.

11. A method according to claim 10, comprising providing flexible screen means for enclosing said trap chamber, and permitting bird bills to enter said trap chamber through the screen means.

12. A method according to claim 11, which comprises forming said screen means from parallel flexible strands.

13. A method according to claim 11, which comprises forming said screen means from a panel subdivided into resiliently pivotally connected panel segments.

14. A method of mosquito control, which comprises:

providing a foraminous floatable barrier panel having openings therethrough through which a female mosquito can deposit eggs but which openings are too small to permit a mature mosquito to pass therethrough;

placing said panel in floating relation on a body of water confined within a receptacle having walls conforming to the edges of the panel so that a mosquito cannot escape around the edge of the panel;

and locating the mosquito trap thus provided in an environment where female mosquitos are attracted to the water through the openings in the panel to deposit their eggs so that larva will develop in the water under the panel and thereby trapping and drowning mosquitos which may mature, by preventing escape thereof from said body of water through said barrier.

15. A method according to claim 14, which comprises providing said panel with water pool depressions at said holes to enhance attraction of the trap for female mosquitos seeking to lay eggs in the water.

* * * * *